US00RE35852E

United States Patent [19]

Takagi

[11] E Patent Number: Re. 35,852

[45] Reissued Date of Patent: Jul. 21, 1998

[54] POWER SUPPLY FREQUENCY REGULATING DEVICE FOR VIBRATION WAVE DRIVEN MOTOR

[75] Inventor: Tadao Takagi, Yokohama, Japan

[73] Assignee: Nikon Corporation, Tokyo, Japan

[21] Appl. No.: 396,323

[22] Filed: Feb. 28, 1995

Related U.S. Patent Documents

Reissue of:

[64] Patent No.: 5,061,882
Issued: Oct. 29, 1991
Appl. No.: 468,201
Filed: Jan. 22, 1990

U.S. Applications:

[63] Continuation of Ser. No. 138,833, Oct. 19, 1993, abandoned, which is a continuation of Ser. No. 361,744, May 30, 1989, Pat. No. 4,914,337, which is a continuation of Ser. No. 152,644, Feb. 5, 1988, abandoned.

[30] Foreign Application Priority Data

Feb. 9, 1987 [JP] Japan ..... 62-27771

[51] Int. Cl.[6] ..... H01L 41/08

[52] U.S. Cl. ..... 318/116; 310/316

[58] Field of Search ..... 310/316, 317; 318/116

[56] References Cited

U.S. PATENT DOCUMENTS

| | | | |
|---|---|---|---|
| 4,510,411 | 4/1985 | Hakamata et al. | 310/316 |
| 4,513,219 | 4/1985 | Katsuma et al. | 310/317 X |
| 4,692,649 | 9/1987 | Izukawa et al. | 310/366 X |
| 4,692,672 | 9/1987 | Okuno | 310/328 X |
| 4,713,571 | 12/1987 | Suzuki et al. | 310/328 X |
| 4,727,276 | 2/1988 | Izukawa et al. | 310/316 |
| 4,833,358 | 5/1989 | Suzuki et al. | 310/323 X |
| 4,888,514 | 12/1989 | Takahashi et al. | 310/316 |
| 4,914,337 | 4/1990 | Takagi | 310/316 |
| 4,954,741 | 9/1990 | Furutsu et al. | 310/316 |
| 5,136,215 | 8/1992 | Izukawa | 318/116 |
| 5,159,253 | 10/1992 | Shimuzu et al. | 318/606 |

*Primary Examiner*—Mark O. Budd
*Attorney, Agent, or Firm*—Shapiro and Shapiro

[57] ABSTRACT

A vibration wave driven motor comprise a comparator for comparing a resonance frequency of the motor with a power supply frequency and a frequency setter for setting the power supply frequency according to a predetermined algorithm in response to the output of the comparator. The frequency setter is provided with an algorithm which, if the power supply frequency is identified lower than the resonance frequency by the comparator, brings the power supply frequency toward an optimum frequency through a predetermined frequency higher than the resonance frequency.

13 Claims, 2 Drawing Sheets

POWER SUPPLY FREQUENCY REGULATING DEVICE FOR VIBRATION WAVE DRIVEN MOTOR

Matter enclosed in heavy brackets [ ] appears in the original patent but forms no part of this reissue specification; matter printed in italics indicates the additions made by reissue.

[This is] *This is a continuation of application Ser. No. 08/138,833 filed Oct. 19, 1993, now abandoned, which is* a continuation application of Ser. No. 361,744 filed May 30, 1989, now U.S. Pat. No. 4,914,337 issued Apr. 3, 1990, which is a continuation of Ser. No. 152,644 filed Feb. 5, 1988, now abandoned.

BACKGROUND OF THE INVENTION

1. Field of the Invention

The present invention relates to a power supply frequency regulating device for a motor utilizing ultrasonic vibration.

2. Related Background Art

Prior art of such device is for example disclosed in the U.S Pat. No. 4,510,411 which describes a technology for controlling the exciting frequency of an AC power supply at the resonance frequency of the motor.

Also the U.S. patent application Ser. No. 929,351 filed Nov. 12, 1986, now U.S. Pat. No. 4,743,788, issued May 10, 1988 and assigned to the assignee of the present application discloses a technology for controlling the exciting frequency at a frequency range higher than the resonance frequency of the motor.

In this prior art the exciting frequency is controlled on the assumption that the amplitude of vibration of the vibration wave driven motor is correlated with the exciting frequency, or that a fixed amplitude can be obtained for a frequency as long as external conditions remain unchanged.

However the present invention has subsequently found, experimentally, that the frequency-amplitude characteristic of a vibration wave driven motor shows a strong hysteresis. Therefore, in the course of control of the power supply frequency to an optimum value, such optimizing operation becomes impossible if the function point on the frequency-amplitude characteristic curve moves to the undesired side of the hysteresis in the motor drive.

SUMMARY OF THE INVENTION

The object of the present invention is to provide a vibration wave driven motor capable of secure and rapid frequency control.

According to the present invention, for achieving the above-mentioned object, there are provided a comparator for comparing the resonance frequency of the motor with the power supply frequency, and a frequency setter for setting the power supply frequency according to a predetermined algorithm in response to the output of said comparator. Said frequency setter is provided with an algorithm which, if the power supply frequency is identified lower than the resonance frequency by said comparator, brings said power supply frequency toward an optimum frequency through a predetermined frequency higher than the resonance frequency.

Therefore, even when the power supply frequency becomes lower than the resonance, frequency so that the function point moves to the undesired side of the hysteresis curve, the present invention varies said power supply frequency through a predetermined frequency higher than the resonance frequency to promptly return the operating point to the desired side of the hysteresis curve, thereby resolving the drawback resulting from the hysteresis phenomenon.

DETAILED DESCRIPTION OF THE PREFERRED EMBODIMENTS

Figure 1:
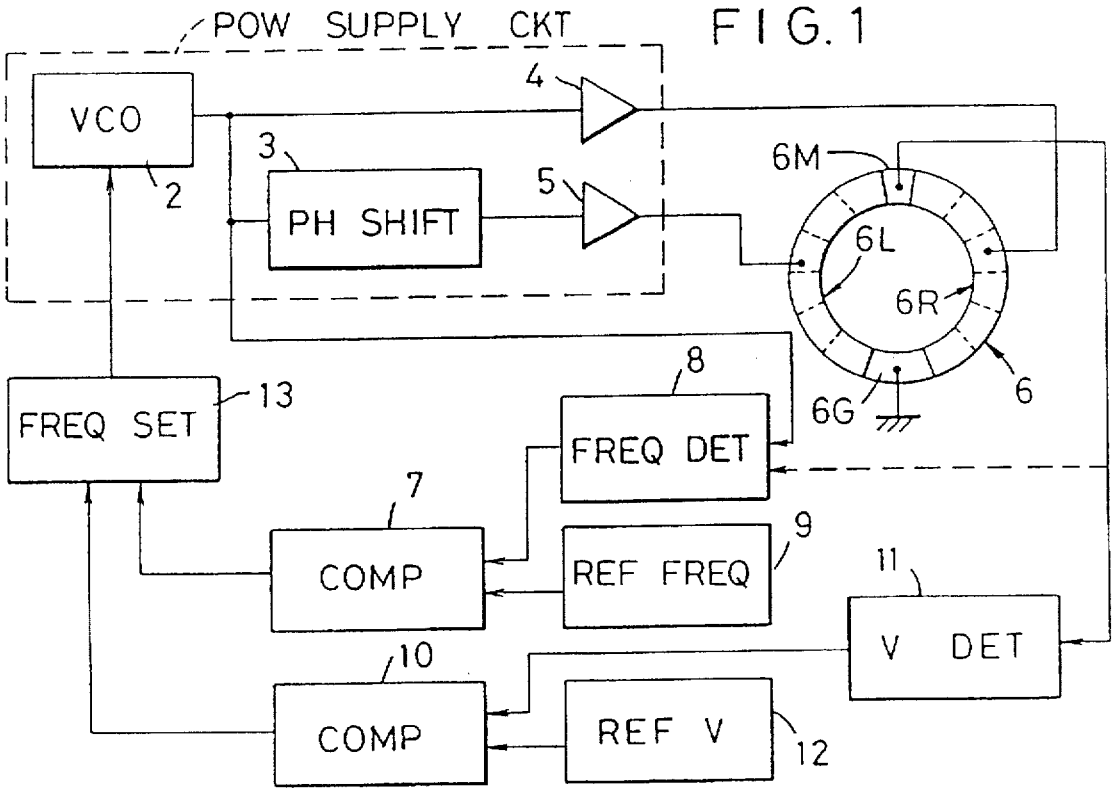
FIG. 1 is a block diagram of an embodiment of the present invention.

FIG. 1 is a block diagram of an embodiment of the present invention.

A power supply circuit for driving the motor is provided with a voltage-controlled oscillator 2 for generating a high-frequency signal whose frequency is controlled in response to the input voltage. The output of said oscillator 2 is divided into two, one of which is supplied to an amplifier 4 while the other is supplied through a phase shifter 3 to an amplifier 5. Said phase shifter 3 shifts the phase by $+\pi/2$ or $-\pi/2$.

Figure 2:
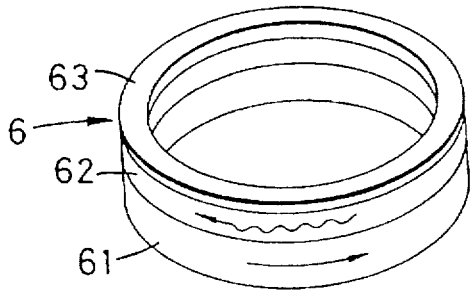
FIG. 2 is a schematic perspective view of a motor.

A vibration wave driven motor 6 is provided, as shown in FIG. 2, with a stator composed of a resilient member 62 maintained in contact with a rotor 61, and a piezoelectric member 63 for exciting said resilient member. On the surface of said piezoelectric member there are formed four electrodes 6L, 6R, 6G and 6M as illustrated in FIG. 1, in which the electrodes 6L and 6R are respectively connected to the outputs of the amplifiers 4, 5 while the electrode 6G is grounded. The positional relationship of these electrodes and the state under electrodes will not be explained in detail as they were already disclosed in the aforementioned U.S. Pat. No. 4,510,411.

The frequency of the voltage supplied from the power supply circuit to the electrodes 6L, 6R will be hereinafter referred to as the power supply frequency.

The electrode 6M does not receive any input voltage, and the corresponding piezoelectric member generates a voltage, hereinafter called monitor voltage, corresponding to the amplitude of vibration of the stator. This voltage generation is achieved by a piezoelectric phenomenon of said piezoelectric member, as detailedly disclosed in said U.S. Pat. No. 4,510,411. disclosed in said U A comparator 7 compares the frequency of a high-frequency output signal of the oscillator 2 monitored by a frequency detector 8 (or the frequency of the monitor voltage generated at the electrode 6M), with a reference frequency generated by a reference frequency generator 9.

A comparator 10 compares the monitor voltage monitored by a voltage detector 11, with a reference voltage generated by a reference voltage generator 12.

A frequency setting device 13, receives the output signals from the comparators 7 and 10, determining an optimum frequency to be supplied to the vibration wave driven motor according to a predetermined algorithm to be explained later, and sends a voltage corresponding to said optimum frequency to the voltage-controlled oscillator 2.

The above-mentioned components 7–13 may be composed of discrete circuit components, but can be easily replaced by a microcomputer.

Figure 3:
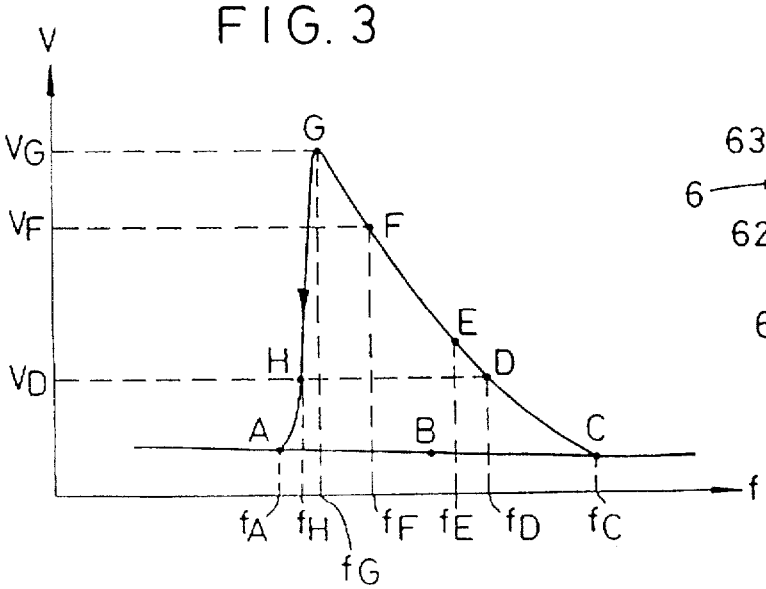
FIG. 3 is a chart showing the relation between the input frequency and the detected voltage.

FIG. 3 shows the resonance characteristic of the stator of the motor, represented by the monitor voltage V in the ordinate as a function of the frequency f in the abscissa.

The resonance curve shows hysteresis assuming, between frequencies fA and fC, a curve A-G-C desired for the motor control and another, undesired, curve A-B-C. A point G indicates the resonance point.

When the power supply frequency fx is varied in a section G-A, the operating point can only move in a direction from G to A. In practice, if the power supply frequency fx changes to a lower frequency beyond the point G, the entire resonance curve is temporarily shifted toward the higher frequency side. Consequently the function point drops close to the new position of the point A created by said movement of the resonance curve, and is eventually stabilized at a position close to the point A between the points A and B after the subsequent return of the resonance curve to the original position.

Therefore, when the motor is driven at a point F, if the resonance frequency becomes higher than the power supply frequency due to a sudden change in torque, or if the power supply frequency becomes lower than the resonance frequency for example due to an external electric perturbation, the motor driving function is abruptly stopped and is not restored.

Figure 4:
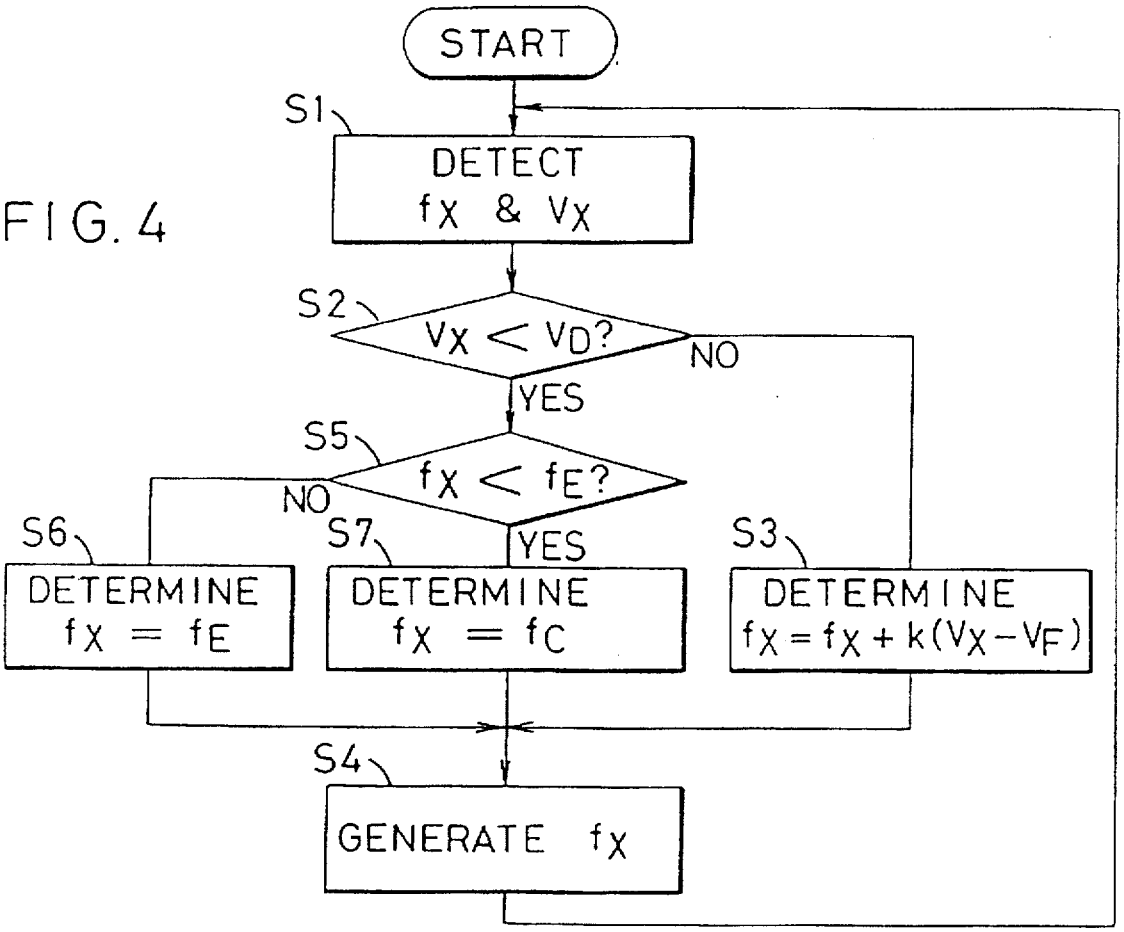
FIG. 4 is a flow chart showing the control sequence of said embodiment.

In the present embodiment, consequently, the circuit shown in FIG. 1 is controlled according to an algorithm represented by a flow chart shown in FIG. 4.

At the start of sequence, the frequency, detector 8 and the voltage detector 11 respectively output the power supply frequency fx and the monitor voltage Vx (step S1). In a step S2, the comparator 10 compares the monitor voltage Vx with the reference voltage VD from the reference voltage generator 12.

It is assumed that the ideal operating point F is at a frequency fF slightly higher, for example by about 1%, than the resonance frequency of the resonance point G. The above-mentioned reference voltage VD is lower than the monitor voltage VF at the ideal operating point F, and is selected in the order of ⅓ to ½ of said monitor voltage VF.

(i) If the initial function point is in a section D-G: the monitor voltage VX is larger than the reference voltage VD, so that the sequence proceeds to a step S3 for a determining operation by the frequency setting device 13. Said device 13 calculates the difference between the frequency fF and the power supply frequency fx by multiplying the difference between the voltage Vf and the monitor voltage VX at the power supply frequency with a constant k, and adds thus obtained difference to the frequency fx to determine the frequency at the ideal function point or a point close thereto.

As will be apparent from the foregoing explanation, the constant k corresponds to the average inclination between the points D, G of the resonance curve.

The frequency setting device 13 sends a voltage corresponding to the determined frequency to the oscillator 2, which thus generates said determined frequency (step S4). The above-mentioned procedure is repeated until the function point reaches a predetermined vicinity of the ideal function point F.

(ii).If the initial function point is positioned in a section D-C at a higher frequency than the point D the monitor voltage VX is smaller than the reference voltage VD, so that the sequence proceeds from the discriminating step S2 to a step S5 for comparing the power supply frequency fx with the reference frequency fE. The resonance curve can be shifted along the axis of frequency, for example due to a change in the torque. Said reference frequency fE is so selected as to be always positioned between the frequencies fF and fD regardless of said shift of the resonance curve, and not to interfere with fF or fD. As the power supply frequency fx is not lower than the frequency fE, the sequence proceeds from the step S5 to a step S6 for a determining operation by the frequency setting device 13. In this case the setting device 13 selects the frequency fE as the power supply frequency fx. Then the oscillator 2 outputs the frequency fE in the step S4, and the sequence returns to the step S1. Subsequently an approach toward the ideal function point F is made by repeating a loop through the steps S2 and S3.

(iii) If the initial function point is not in the areas of (i) and (ii): the function point is positioned at the point A or in the vicinity thereof as explained before. A control from the points A to F through the points H and G is not realizable due to the presence of hysteresis. Consequently the algorithm realizes the move to the point F through a point C of a predetermined frequency.

The sequence proceeds from the step S2 to the step S5 since VX <VD, and further to a step S7 since fX <fE.

In the step S7, the frequency setting device 13 sets the power supply frequency at fc. Since the monitor voltage from the motor drive at the frequency fc is smaller than the reference voltage VD, the sequence proceeds to the step S5 after the second discrimination in the step S2. Since fx >fE in this case, the sequence proceeds further to the step S6 for setting the power supply frequency fx at fE. Thereafter an approach is made toward the ideal function point F according to the case (i).

The present invention is principally featured by a fact, when the power supply frequency is lower than the resonance frequency, of once controlling the power supply frequency to a value higher than the resonance frequency and then regulating it to the optimum frequency. Consequently, if the resonance frequency is known, the foregoing embodiment can be made simpler by utilizing the comparison of said resonance frequency with the power supply frequency.

However, the resonance frequency is variable according to the external conditions as explained before. Regardless of whether the power supply frequency is to be controlled at the resonance frequency as described in the aforementioned U.S. patent or at a value different from the resonance frequency as in the present embodiment, direct detection of the resonance frequency is not practical as it requires an additional complicated structure.

On the other hand, the above-explained structure of the foregoing embodiment including the circuit blocks 7–12 can achieve an effect equivalent to the direct comparison, through an indirect comparison of the resonance frequency and the power supply frequency utilizing the monitor voltage and the power supply frequency.

In the foregoing embodiment the step S7 immediately brings the power supply frequency fx to the frequency fc when said power supply frequency fx is identified to be lower than the resonance frequency, but it is also possible to gradually increase the power supply frequency fx in continuous manner. In such case the response of the control becomes slower but the control is still possible.

Also in the foregoing embodiment, the monitor voltage is used in the comparison of the resonance frequency and the power supply frequency or in the approach toward the ideal function point, but the present invention is not limited to the use of such monitor voltage and can also be based on the phase difference between the voltage and the current supplied to the motor.

Figure 5:
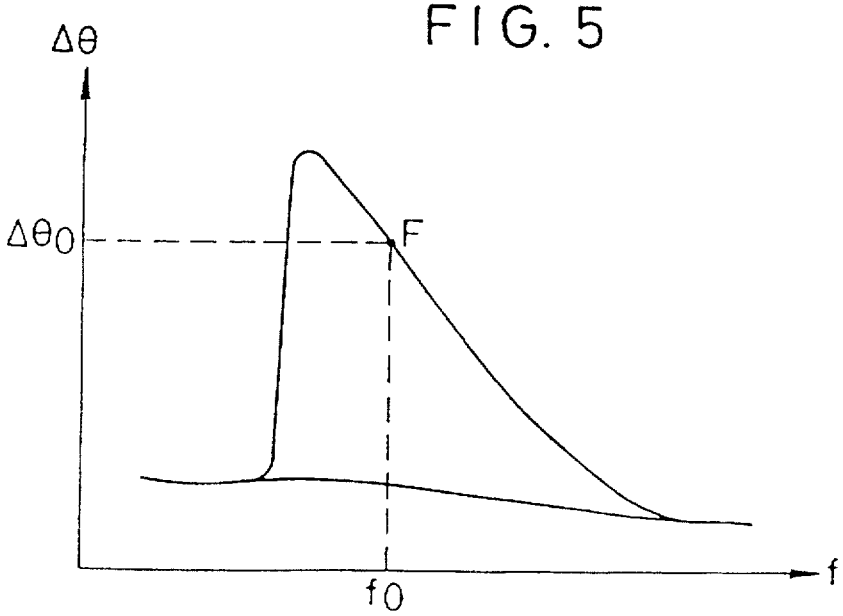
FIG. 5 is a chart showing the relation between the input frequency and the phase difference.

FIG. 5 shows a resonance curve, represented by the phase difference Δ74 between the voltage and current supplied to the motor in the ordinate and the frequency in the abscissa. In this manner a resonance curve with hysteresis can be obtained also by monitoring said phase difference, and the optimization of the power supply frequency can be achieved in the same manner by replacing the monitor voltage detector in the foregoing embodiment with a phase difference detector.

What is claimed is:

1. A vibration wave driven motor comprising:

a movable member;

stator means comprising a resilient member having a surface maintained in contact with said movable member, and electrostriction means adapted to be vibrated by an AC voltage to generate a vibration wave on the surface of said resilient member;

power supply means for supplying said electrostriction means with said AC voltage;

means for distinguishing whether a desired operating state of said motor is obtained or is not obtained while said AC voltage is supplied, said desired operating state being a state in which the amplitude of said vibration wave increases according to decrease of the frequency of said AC voltage; and means for controlling the frequency of said AC voltage so that when said distinguishing means distinguishes the said desired operating state is not obtained, the frequency of said AC voltage is increased to a frequency within a predetermined frequency range.

2. A vibration wave driven motor comprising:

a movable member;

stator means comprising a resilient member having a surface maintained in contact with said movable member, and electrostriction means adapted to be vibrated by an AC voltage to generate a vibration wave on the surface of said resilient member, said stator means having a frequency response curve defined by a relationship between frequency of said AC voltage and amplitude of said vibration wave, said frequency response curve having a desirable motor operating region and a non-desirable motor operating region, said desirable region including a region of low frequency where the amplitude of said vibration wave is high, a region of medium frequency where the amplitude of said vibration wave is medium, and a region of high frequency where the amplitude of said vibration wave is low;

power supply means for supplying said electrostriction means with said AC voltage;

means for distinguishing whether an operating point on said frequency response curve is positioned at said desirable region or said non-desirable region; and means for controlling the frequency of said AC voltage so that when said distinguishing means distinguishes that said operating point is positioned at said non-desirable region, said frequency of said AC voltage is increased to a frequency higher than a frequency range including said low, medium and high frequencies.

3. A vibration wave driven motor comprising:

a movable member;

stator means comprising a resilient member having a surface maintained in contact with said movable member, and electrostriction means adapted to be vibrated by an AC voltage to generate a vibration wave on the surface of said resilient member, said stator means having a frequency response curve defined by a relationship between frequency of said AC voltage and amplitude of said vibration wave, said curve having a desirable motor operating section where the amplitude of said vibration wave changes in response to a change or frequency in a driving frequency range, and a non-desirable motor operating section where the amplitude of said vibration wave does not substantially change in response to a change of frequency in the same driving frequency range;

power supply means for supplying said electrostriction means with said AC voltage;

means for distinguishing whether an operating point on said frequency response curve is positioned at said desirable section or said non-desirable section; and means for controlling the frequency of said AC voltage so that when said distinguishing means distinguishes that said operating point is positioned at said non-desirable section, the frequency of said AC voltage is increased to a frequency within a predetermined frequency range.

4. A vibration wave driven motor comprising:

a movable member;

stator means comprising a resilient member having a surface maintained in contact with said movable member, and electrostriction means adapted to be vibrated by an AC voltage to generate a vibration wave on the surface of said resilient member;

power supply means for supplying said electrostriction means with said AC voltage;

means for setting the frequency of said AC voltage of said power supply means to an initial frequency;

means for detecting the fact that a desired operating state of said motor is not obtained when said AC voltage of said initial frequency is applied to said [electrostriction means], said desired operating state being a state in which the amplitude of said vibration wave increases according to decrease of the frequency of said AC voltage; and means for controlling the frequency of said AC voltage in response to said detecting means so that the frequency of said AC voltage is changed to a frequency higher than said initial frequency.

5. A vibration wave driven motor comprising:

a movable member;

stator means comprising a resilient member having a surface maintained in contact with said movable member, and electrostriction means adapted to be vibrated by an AC voltage to generate a vibration wave on the surface of said resilient member;

power supply means for supplying said electrostriction means with said AC voltage;

means for distinguishing whether a desired operating state of said motor is obtained or is not obtained while said AC voltage is supplied, said desired operating state being a state in which the amplitude of said vibration wave increases according to decrease of the frequency of said AC voltage; and means for controlling the frequency of said AC voltage so that when said distinguishing means distinguishes that said desired operating state is not obtained, the frequency of said AC voltage is increased to a higher frequency.

6. A vibration wave driven motor comprising:

a movable member;

stator means comprising a resilient member having a surface maintained in contact with said movable member, and electrostriction means adapted to be vibrated by an AC voltage to generate a vibration wave on the surface of said resilient member, said stator means having a frequency response curve defined by a relationship between frequency of said AC voltage and amplitude of said vibration wave, said curve having a desirable motor operating section where the amplitude of said vibration wave changes in response to a change of frequency in a driving frequency range, and a non-desirable motor operating section where the amplitude of said vibration wave does not substantially change in response to a change of frequency in the same driving frequency range;

power supply means for supplying said electrostriction means with said AC voltage;

means for distinguishing whether an operating point on said frequency response curve is positioned at said desirable section or said non-desirable section; and means for controlling the frequency of said AC voltage so that when said distinguishing means distinguishes that said operating point is positioned at said non-desirable section, the frequency of said AC voltage is increased to a higher frequency.

*7. A vibration driven motor comprising:*

*a movable member;*

*a stator member comprising a resilient member having a surface maintained in contact with said movable member, and a piezoelectric member adapted to be vibrated by an AC voltage to generate a vibration on the surface of said resilient member;*

*a power supply circuit which supplies said piezoelectric member with said AC voltage; and*

*circuitry which distinguishes whether a desired operating state of said motor is obtained or is not obtained while said AC voltage is supplied, said desired operating state being a state in which the amplitude of said vibration increases according to decrease of the frequency of said AC voltage, and which controls the frequency of said AC voltage so that when said circuity distinguishes that said desired operating state is not obtained, the frequency of said AC voltage is increased to a frequency within a predetermined frequency range.*

*8. A vibration driven motor comprising:*

*a movable member;*

*a stator comprising a resilient member having a surface maintained in contact with said movable member, and a piezoelectric member adapted to be vibrated by an AC voltage to generate a vibration on the surface of said resilient member, said stator having a frequency response curve defined by a relationship between frequency of said AC voltage and amplitude of said vibration, said frequency response curve having a desirable motor operating region and a non-desirable motor operating region, said desirable region including a region of low frequency where the amplitude of said vibration is high, a region of medium frequency where the amplitude of said vibration is medium, and a region of high frequency where the amplitude of said vibration is low;*

*a power supply circuit which supplies said piezoelectric member with said AC voltage; and*

*circuitry which distinguishes whether an operating point on said frequency response curve is positioned at said desirable region or said non-desirable region, and which controls the frequency of said AC voltage so that when said circuity distinguishes that said operating point is positioned at said non-desirable region, said frequency of said AC voltage is increased to a frequency higher than a frequency range including said low, medium and high frequencies.*

*9. A vibration driven motor comprising:*

*a movable member;*

*a stator member comprising a resilient member having a surface maintained in contact with said movable member, and a piezoelectric member adapted to be vibrated by an AC voltage to generate a vibration on the surface of said resilient member, said stator member having a frequency response curve defined by a relationship between frequency of said AC voltage and amplitude of said vibration, said curve having a desirable motor operating section where the amplitude of said vibration changes in response to a change of frequency in a driving frequency range, and a non-desirable motor operating section where the amplitude of said vibration does not substantially change in response to a change of frequency in the same driving frequency range;*

*a power supply circuit which supplies said piezoelectric member with said AC voltage; and*

*circuitry which distinguishes whether an operating point on said frequency response curve is positioned at said desirable section or said non-desirable section, and which controls the frequency of said AC voltage so that when said circuity distinguishes that said operating point is positioned at said non-desirable section, the frequency of said AC voltage is increased to a frequency within a predetermined frequency range.*

*10. A vibration driven motor comprising:*

*a movable member;*

*a stator member comprising a resilient member having a surface maintained in contact with said movable member, and a piezoelectric member adapted to be vibrated by an AC voltage to generate a vibration on the surface of said resilient member;*

*a power supply circuit which supplies said piezoelectric member with said AC voltage; and*

*circuitry which sets the frequency of said AC voltage of said power supply circuit to an initial frequency, which detects the fact that a desired operating state of said motor is not obtained when said AC voltage of said initial frequency is applied to said piezoelectric member, said desired operating state being a state in which the amplitude of said vibration increases according to decrease of the frequency of said AC voltage, and which controls the frequency of said AC voltage in response to detection of said fact so that the frequency of said AC voltage is changed to a frequency higher than said initial frequency.*

*11. A vibration driven motor comprising:*

*a movable member;*

*a stator member comprising a resilient member having a surface maintained in contact with said movable member, and a piezoelectric member adapted to be vibrated by an AC voltage to generate a vibration on the surface of said resilient member;*

*a power supply circuit which supplies said piezoelectric member with said AC voltage; and*

*circuitry which distinguishes whether a desired operating state of said motor is obtained or is not obtained while said AC voltage is supplied, said desired operating state being a state in which the amplitude of said vibration increases according to decrease of the frequency of said AC voltage, and which controls the frequency of said AC voltage so that when said circuity distinguishes that said desired operating state is not obtained, the frequency of said AC voltage is increased to a higher frequency.*

*12. A vibration driven motor comprising:*

*a movable member;*

*a stator member comprising a resilient member having a surface maintained in contact with said movable member, and a piezoelectric member adapted to be vibrated by an AC voltage to generate a vibration on the surface of said resilient member, said stator member having a frequency response curve defined by a relationship between frequency of said AC voltage and amplitude of said vibration, said curve having a desirable motor operating section where the amplitude of said vibration changes in response to a chance of frequency in a driving frequency range, and a non-desirable motor operating section where the amplitude of said vibration does not substantially change in response to a chance of frequency in the same driving frequency range;*

*a power supply circuit which supplies said piezoelectric member with said AC voltage; and*

*circuitry which distinguishes whether an operating point on said frequency response curve is positioned at said desirable section or said non-desirable section, and which controls the frequency of said AC voltage so that when said circuity distinguishes that said operating point is positioned at said non-desirable section, the frequency of said AC voltage is increased to a higher frequency.*

*13. A vibration motor comprising:*

*a movable member;*

*a stator member comprising a resilient member having a surface maintained in contact with said movable member, and a piezoelectric member adapted to be vibrated by an AC voltage to generate a vibration;*

*a power supply circuit which supplies said piezoelectric member with said AC voltage and thereby places said motor in an operating state; and*

*circuitry which detects the fact that said motor has changed from operating state to a state which would cause said motor to stop, and which controls the frequency of said AC voltage so that when said circuitry detects said fact, the frequency of said AC voltage is increased from an existing frequency of said AC voltage to a higher frequency sufficient to restore said operating state.*

* * * * *